(12) United States Patent
Amirparviz (10) Patent No.: US 8,582,209 B1
(45) Date of Patent: Nov. 12, 2013

(54) CURVED NEAR-TO-EYE DISPLAY (75) Inventor: Babak Amirparviz, Mountain View, CA (US)

(73) Assignee: Google Inc., Mountain View, CA (US)

(*) Notice: Subject to any disclaimer, the term of this patent is extended or adjusted under 35 U.S.C. 154(b) by 255 days.

(21) Appl. No.: 12/938,644

(22) Filed: Nov. 3, 2010

(51) Int. Cl.
G02B 27/14 (2006.01)

(52) U.S. Cl.
USPC .......................................... 359/630

(58) Field of Classification Search
USPC ................................. 359/630–633
See application file for complete search history.

(56) References Cited

U.S. PATENT DOCUMENTS

| | | | |
|---|---|---|---|
| 5,093,567 A | 3/1992 | Staveley | |
| 5,379,140 A * | 1/1995 | Michel et al. | 349/13 |
| 5,539,422 A | 7/1996 | Heacock et al. | |
| 5,696,521 A | 12/1997 | Robinson et al. | |
| 5,715,337 A | 2/1998 | Spitzer et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |

(Continued)

FOREIGN PATENT DOCUMENTS

| | | |
|---|---|---|
| GB | 2272980 A | 6/1994 |
| WO | WO96/05533 A1 | 2/1996 |
| WO | WO 99/46619 A | 9/1999 |

OTHER PUBLICATIONS

Mukawa, Hiroshi et al., "8.4: Distinguished Paper: A Full Color Eyewear Display using Holographic Planar Waveguides", SID Symposium Digest of Technical Papers, May 2008, pp. 89-92, vol. 39, Issue 1.

(Continued)

Primary Examiner — Scott J Sugarman
Assistant Examiner — Vipin Patel
(74) Attorney, Agent, or Firm — Blakely Sokoloff Taylor & Zafman LLP (57) ABSTRACT

A display apparatus includes an array of microlenses disposed in or on a substrate. In one embodiment, the apparatus includes scattering centers disposed in or on the substrate and offset relative to the microlenses. The scattering centers are positioned substantially at focal points of the microlenses such that light incident upon a first side the substrate is scattered off of the scattering centers and collimated by corresponding ones of the microlenses before emission from the display apparatus. In another embodiment, the apparatus includes light emitting pixels disposed in or on the substrate and offset relative to the microlenses. The light emitting pixels are positioned substantially at focal points of the microlenses such that non-collimated light emitted from the light emitting pixels is collimated by the microlenses upon emission from the display apparatus.

22 Claims, 6 Drawing Sheets

(56) References Cited

U.S. PATENT DOCUMENTS

| | | | |
|---|---|---|---|
| 6,538,799 B2 | 3/2003 | McClelland et al. | |
| 6,618,099 B1 | 9/2003 | Spitzer | |
| 6,690,516 B2 | 2/2004 | Aritake et al. | |
| 6,701,038 B2 | 3/2004 | Rensing et al. | |
| 6,724,354 B1 | 4/2004 | Spitzer et al. | |
| 6,738,535 B2 | 5/2004 | Kanevsky et al. | |
| 6,747,611 B1 | 6/2004 | Budd et al. | |
| 6,829,095 B2 | 12/2004 | Amitai | |
| 6,879,443 B2 | 4/2005 | Spitzer et al. | |
| 7,021,777 B2 | 4/2006 | Amitai | |
| 7,158,096 B1 | 1/2007 | Spitzer | |
| 7,242,527 B2 | 7/2007 | Spitzer et al. | |
| 7,325,943 B2 * | 2/2008 | Benoit et al. | 362/247 |
| 7,346,260 B2 | 3/2008 | Arakida et al. | |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,619,806 B2 * | 11/2009 | Hagood et al. | 359/290 |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,751,122 B2 | 7/2010 | Amitai | |
| 7,843,403 B2 | 11/2010 | Spitzer | |
| 7,876,489 B2 | 1/2011 | Gandhi et al. | |
| 7,900,068 B2 | 3/2011 | Weststrate et al. | |
| 8,004,765 B2 | 8/2011 | Amitai | |
| 8,189,263 B1 * | 5/2012 | Wang et al. | 359/633 |
| 2001/0004251 A1 * | 6/2001 | Kurematsu et al. | 345/88 |
| 2001/0021058 A1 | 9/2001 | McClelland et al. | |
| 2001/0022682 A1 | 9/2001 | McClelland et al. | |
| 2003/0090439 A1 | 5/2003 | Spitzer et al. | |
| 2003/0184664 A1 * | 10/2003 | Iwasaki | 348/272 |
| 2005/0174651 A1 | 8/2005 | Spitzer et al. | |
| 2006/0187512 A1 * | 8/2006 | Sprague et al. | 359/204 |
| 2006/0192306 A1 | 8/2006 | Giller et al. | |
| 2006/0192307 A1 | 8/2006 | Giller et al. | |
| 2007/0047091 A1 | 3/2007 | Spitzer et al. | |
| 2007/0103388 A1 | 5/2007 | Spitzer | |
| 2008/0106775 A1 | 5/2008 | Amitai | |
| 2008/0151379 A1 * | 6/2008 | Amitai | 359/630 |
| 2008/0186604 A1 | 8/2008 | Amitai | |
| 2008/0198471 A1 | 8/2008 | Amitai | |
| 2008/0219025 A1 | 9/2008 | Spitzer et al. | |
| 2008/0247722 A1 | 10/2008 | Van Gorkom et al. | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0161383 A1 | 6/2009 | Meir et al. | |
| 2009/0237804 A1 | 9/2009 | Amitai et al. | |
| 2010/0046070 A1 | 2/2010 | Mukawa | |
| 2010/0046219 A1 | 2/2010 | Pijlman et al. | |
| 2010/0103078 A1 | 4/2010 | Mukawa et al. | |
| 2010/0149073 A1 | 6/2010 | Chaum et al. | |
| 2010/0171680 A1 | 7/2010 | Lapidot et al. | |
| 2010/0278480 A1 | 11/2010 | Vasylyev et al. | |
| 2011/0213664 A1 | 9/2011 | Osterhout et al. | |

OTHER PUBLICATIONS

Levola, Tapani, "Diffractive Optics for Virtual Reality Displays", Academic Dissertation, University of Joensuu, Department of Physics, Vaisala Laboratory, 2005, 26 pages.

Cakmakci, Ozan et al., "Head-Worn Displays: A Review", Journal of Display Technology, Sep. 2006, 20 pages, vol. 2, Issue 3.

* cited by examiner

CURVED NEAR-TO-EYE DISPLAY

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Military applications include tactical displays of maps and thermal imaging. Other application fields include video games, transportation, and telecommunications. Due to the infancy of this technology, there is certain to be new found practical and leisure applications as the technology evolves; however, many of these applications are currently limited due to the cost, size, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, system and method for fabrication of a curved near-to-eye display are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
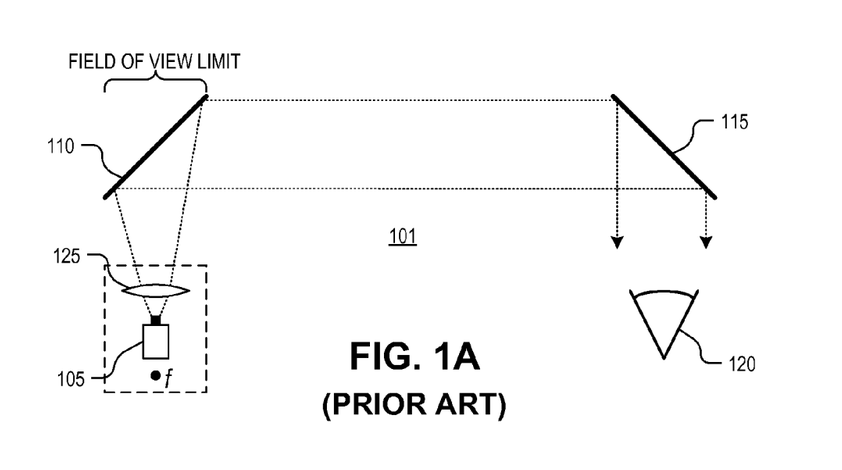
FIG. 1A illustrates a first conventional near-to-eye optical system using an input lens and two minors.

FIG. 1A illustrates a first conventional near-to-eye optical system 101 using an input lens and two minors. An image source 105 outputs an image that is reflected by two minors 110 and 115, which form an image near to eye 120. Image source 105 is typically mounted above the head or to the side of the head, while minors 110 and 115 bend the image around the front of the viewer's face to his eye 120. Since the human eye is typically incapable of focusing on objects placed within a few centimeters, this system requires a lens 125 interposed between the first minor 110 and image source 105. Lens 125 creates a virtual image that is displaced further back from the eye than the actual location of minor 115 by positioning image source 105 inside of the focal point f of lens 125. Optical system 101 suffers from a small field of view (e.g., approximately 20 degrees) limited by the extent of mirrors 110 and 115 and the bulkiness of lens 125. The field of view can be marginally improved by placing mirrors 110 and 115 within a high index material to compress the angles of incidence, but is still very limited.

Figure 1B:
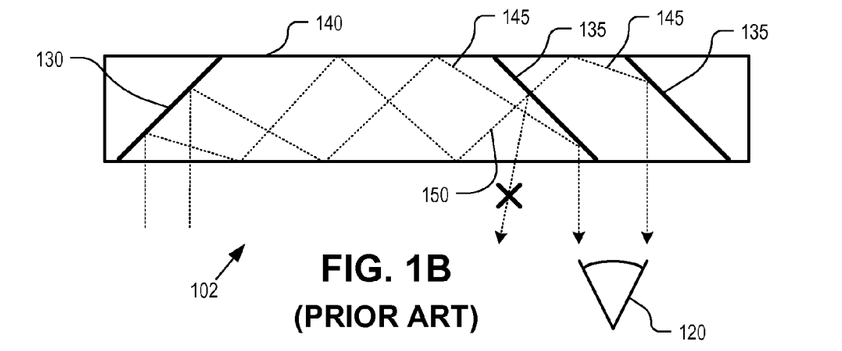
FIG. 1B illustrates a second conventional near-to-eye optical system using angle sensitive dichroic minors.

FIG. 1B illustrates a second conventional near-to-eye optical system 102 using angle sensitive dichroic minors. Optical system 102 includes a single in-coupling minor 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output minors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others limits the field of view optical system 102.

Figure 1C:
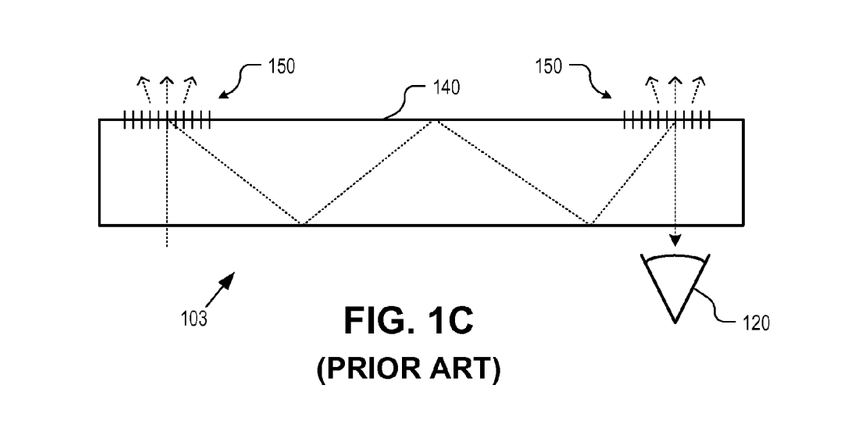
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of minors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is difficult and/or costly. Again, optical system 103 suffers from a limited field of view.

Figure 2:
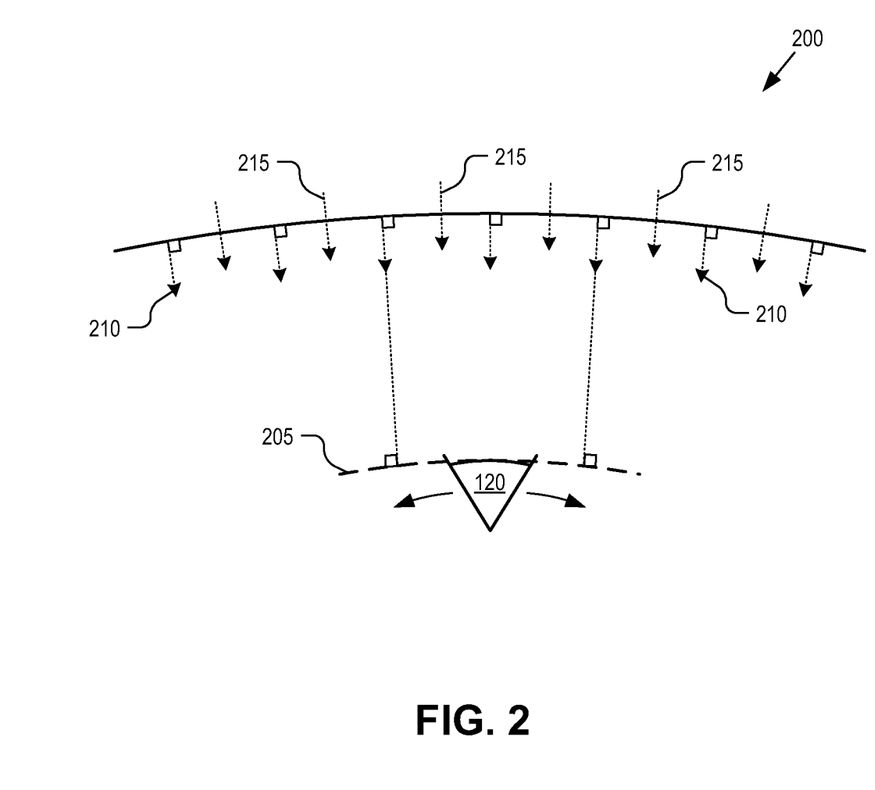
FIG. 2 illustrates a curved optical surface having a curvature that is substantially radial to an arc through which a human eye passes when looking around, in accordance with an embodiment of the invention.

FIG. 2 illustrates a curved optical surface 200, in accordance with an embodiment of the invention. In one embodiment, curved optical surface 200 is flexibly bent or molded to accept or hold a particular surface curvature. In one embodiment, curved optical surface 200 has a curvature that is substantially radial to an arc 205 through which a human eye 120 passes when looking around. In this embodiment, normal vectors extended from curved optical surface 200 towards eye 120 will intersect normal to arc 205, which is the path through which the human eye 120 approximately follows when scanning a scenery or looking around. By emitting light 210 towards eye 120 having a normal trajectory from curved optical surface 200 with little to no divergence, the light reaching eye 120 will appear to be collimated from all viewing angles. This enables curved optical surface 200 to be placed near-to-the eye in a head mounted display ("HMD") or heads-up display ("HUD"), while providing a wide field of view and a wide eye box of an in focus image. As the eye 120 moves along its arc 120, the different portions of the image delivered by emitted light 210 are brought into focus, generating a sort of flashlight effect.

Curvatures may be selected that cause light 210, emitted normal from curved optical surface 200, to converge in front of eye 120 or behind eye 120. These offset convergence points can result in tradeoffs between the field of view and size of the eye box. Typically, if an image convergence point is positioned coincident with eye 120, then a large field of view but a small eye box results and when the image convergence point is offset either directly in front or behind eye 120, this results in a larger eye box at the expense of the field of view. However, by using a curved as opposed to flat optical surface, an increased field of view and eye box can be achieved at the same time. A variety of different curvatures may be selected according to application and design goals.

Curved optical surface 200 may be implemented as a transmissive/emissive surface (e.g., see FIGS. 3A, 3B) or transmissive/reflective surface (e.g., see FIGS. 4A, 4B, 4C) to implement the display piece of an HMD or HUD. By fabricating the substrate of curved optical surface 200 out of transparent or partially transparent materials, external light 215 is permitted to pass through the surface to reach eye 120. Thus, external light 215 delivers a real world image of the scenery beyond curved optical surface 200, while emitted light 210 output from curved optical surface 200 may provide a superimposed or overlaid computer generated image ("CGI") used to augment the real world image.

Figure 3A:
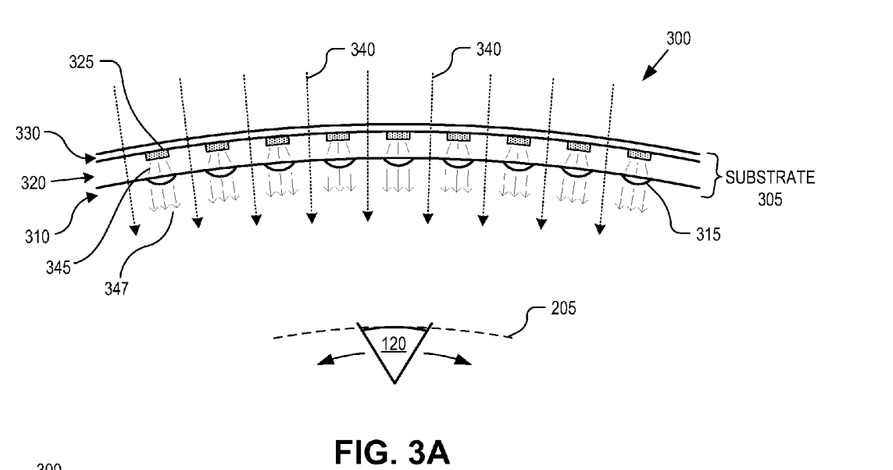
FIG. 3A is a plan view of a near-to-eye curved optical structure including an embedded array of light emitting pixels, in accordance with an embodiment of the invention.
Figure 3B:
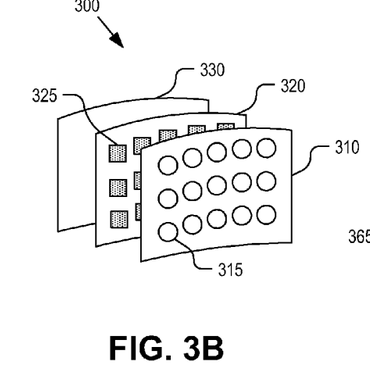
FIG. 3B is a perspective view of sub-layers of a near-to-eye curved optical structure including an embedded array of light emitting pixels, in accordance with an embodiment of the invention.

FIGS. 3A & 3B illustrate a near-to-eye curved optical structure 300 including an embedded array of light emitting pixels, in accordance with an embodiment of the invention. FIG. 3A is a plan view while FIG. 3B is a perspective view of the same. In one embodiment, curved optical structure 300 has properties (e.g., curvature) similar to curved optical surface 200 discussed in FIG. 2; however, other curvatures may be used. The illustrated embodiment of curved optical structure 300 is formed in a substrate 305, which includes a sub-layer 310 having an array of microlenses 315, a sub-layer 320 having an array of light emitting pixels 325, and a sub-layer 330 including control circuitry for controlling light emitting pixels 325.

In one embodiment, sub-layers 310, 320, and 330 represent independent material layers that are laminated or otherwise fused together. In other embodiments, two or all three of the sub-layers are formed in different regions or layers of one or two substrate materials. Accordingly, sub-layers 310, 320, and 330 may be physically different material layers or relative regions/layers within a single material layer. For example, in one embodiment, sub-layer 310 which includes microlenses 315 may be formed on a frontside of a substrate layer while light emitting pixels 325 are formed in the interior or backside of the same substrate layer. Sub-layer 330 may then be disposed onto the backside of this substrate layer. In another embodiment, all three sub-layers may be built up consecutively one on the other via conventional fabrication techniques including deposition, etching, epitaxy, polymer spin on, reflow, etc.

In one embodiment, curved optical structure 300 is partially or semi-transparent and substrate 305 is fabricated of a clear substrate material (e.g., polymer, glass, quartz, thermoplastic, etc.). The components of each sub-layer are made sufficiently small and the interstitial gaps are sufficiently large to result in a semi-transparent structure that passes external light 340. Substrate 305 maybe flexible and therefore conformable to a selected shape and curvature using an appropriate frame assembly. Alternatively, substrate 305 may be rigid and its fixed curvature imparted during fabrication.

The array of light emitting pixels 325 is offset behind the array of microlenses 315. Each light emitting pixel 325 is aligned with a corresponding microlens 315 and positioned substantially at the focal distance of its associated microlens 315. Collectively, a light emitting pixel and microlens pair may be considered a pixel unit of curved optical structure 300. Although each light emitting pixel 325 emits non-collimated, divergent light 345, its associated microlens 315 collimates divergent light 345, which is output from the associated microlens 315 as collimated output light 347. While the light output from a given light emitting pixel 325 is collimated upon emission from its associated microlens 315, due to the curvature of curved optical structure 300, the output light of a given pixel unit may not be collimated relative to surrounding pixel units. However, since light 347 output from each pixel is collimated, each individual pixel will appear in focus and displayed at infinity. In one embodiment, the curvature of curved optical structure 300 is designed to substantially match arc 205 of eye 120, thereby increasing the eye box and field of view of output light 347 relative to a flat surface. In this manner, curved optical structure 300 is well suited for (but not limited to) near-to-eye applications, such HMDs or HUDs.

Sub-layer 310 may be fabricated via a variety of techniques. For example, a clear polymer material may be spun onto the surface of sub-layer 320, patterned into a checkerboard like pattern and then reflowed to allow surface tension of the fluid to gather the liquid polymer into a lens shape. Of course other fabrication techniques may be used. Although the size may variety according to application, each microlens 315 may be approximately 100 to 200 μm in diameter. Larger or smaller microlenses 315 may be used.

Sub-layer 320 may be implemented using a variety of different light emitting technologies integrated onto a transparent or semi-transparent substrate. For example, sub-layer 320 may be formed of a sheet of transparent organic light emitting diodes ("OLEDs"). Sub-layer 330 includes control circuitry for controlling light emitting pixels 325. For example, sub-layer 330 may be a transparent (or partially transparent) thin film transistor layer for active matrix addressing of light emitting pixels 325.

Figure 3C:
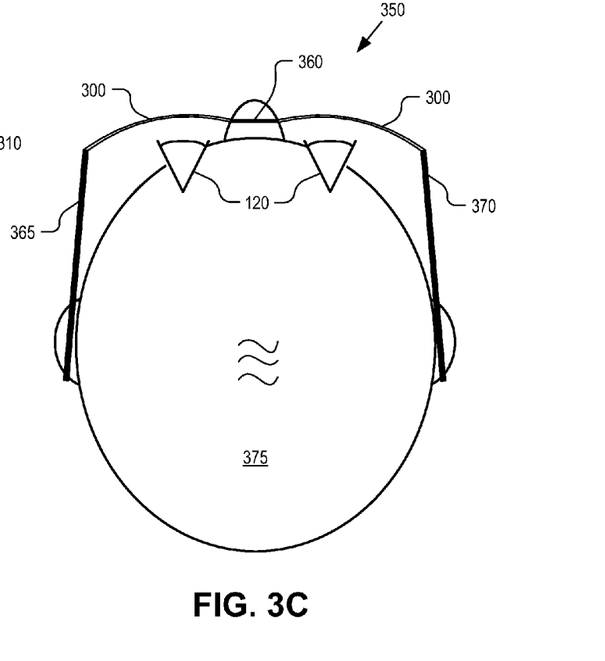
FIG. 3C is a plan view of a near-to-eye display including a curved optical structure having an embedded array of light emitting pixels, in accordance with an embodiment of the invention.

FIG. 3C is a plan view of a demonstrative near-to-eye display 350 including curved optical structures 300, in accordance with an embodiment of the invention. The illustrated embodiment of near-to-eye display 350 includes two curved optical structures 300, and a frame assembly including a nose assembly 360, left ear assembly 365, and right ear assembly 370.

The two curved optical structures 300 are secured into an eye glass arrangement that can be worn on a head 375 of a user. The left and right ear assemblies 365 and 370 rest over the user's ears while nose assembly 360 rests over the user's nose. The frame assembly is shaped and sized to position each curved optical structure 300 in front of a corresponding eye 120 of the user with the sub-layer 310 facing eyes 120. Of course, other frame assemblies may be used (e.g., single, contiguous visor assembly for both eyes).

The illustrated embodiment is capable of displaying an augmented reality to the user. As such, each curved optical structure 300 is partially transparent and permits the user to see a real world image via external light 340. Left and right (binocular embodiment) CGIs may generated by an image processor (not illustrated) coupled to drive the array of light emitting pixels 325 via the control circuitry within sub-layer 330. Left and right CGIs are then output by the left and right curved optical structures 300. Since the output light of each pixel unit is collimated and the curvature of curved optical structure 300 partially or substantially matched to arc 205 of eyes 120, the CGIs are virtually projected at infinity and delivered to eyes 120 with a large eye box and field of view. Although the human eye is typically incapable of bringing objects within a few centimeters into focus, since the output light is virtually displayed at infinity it is readily in focus. The CGIs are seen by the user as virtual images superimposed over the real world as an augmented reality.

Figure 4A:
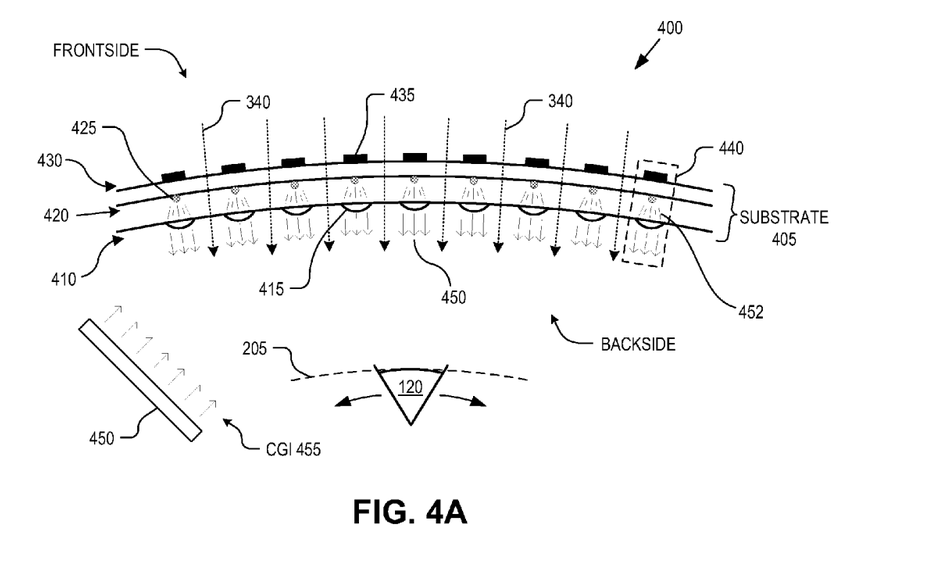
FIG. 4A is a plan view of a near-to-eye curved optical structure including an embedded array of scattering centers, in accordance with an embodiment of the invention.
Figure 4B:
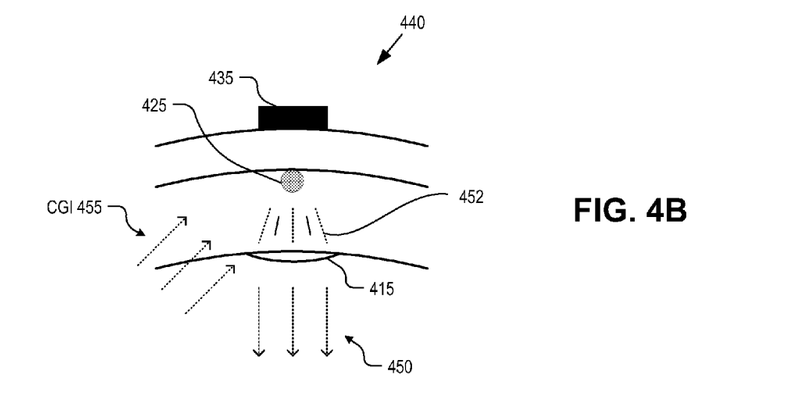
FIG. 4B is a close-up plan view of a near-to-eye curved optical structure including an embedded array of scattering centers, in accordance with an embodiment of the invention.
Figure 4C:
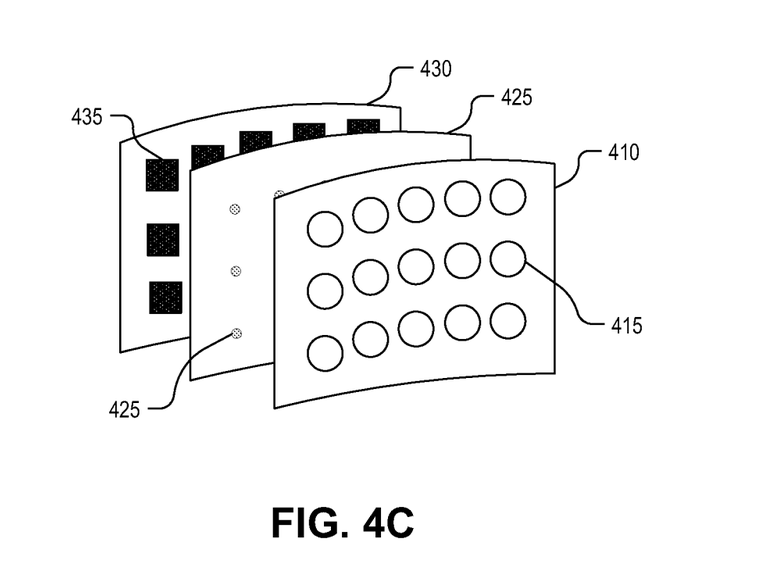
FIG. 4C is a perspective view of sub-layers of a near-to-eye curved optical structure including an embedded array of scattering centers, in accordance with an embodiment of the invention.

FIGS. 4A, 4B, & 4C illustrate a near-to-eye curved optical structure 400 including an embedded array of scattering centers, in accordance with an embodiment of the invention. FIG. 4A is a plan view, FIG. 4B is a close-up of a single pixel unit, and FIG. 4C is a perspective view of the same. In one embodiment, curved optical structure 400 has properties (e.g., curvature) similar to curved optical surface 200 discussed in FIG. 2; however, other curvatures may be used. The illustrated embodiment of curved optical structure 400 is formed in a substrate 405, which includes a sub-layer 410 having an array of microlenses 415, a sub-layer 420 having an array of scattering centers 425, and a sub-layer 430 including an array of opaque structures 435. Microlenses 415, scattering centers 425, and opaque structures 435 are logically grouped into pixel units 440 (see FIG. 4B).

In one embodiment, sub-layers 410, 420, and 430 represent independent material layers that are laminated or otherwise fused together. In other embodiments, two or all three of the sub-layers are formed in different regions or layers of one or two substrate materials. Accordingly, sub-layers 410, 420, and 430 may be physically different material layers or relative regions/layers within a single material layer. For example, in one embodiment, sub-layer 410 which includes microlenses 415 may be formed on a frontside of a substrate layer while light scattering centers 425 are formed in the interior or on the backside of the same substrate layer. Sub-layer 430 may then be disposed onto the backside of this substrate layer. In another embodiment, all three sub-layers may be built up consecutively one on the other via conventional fabrication techniques including deposition, etching, epitaxy, polymer spin on, reflow, etc.

In one embodiment, curved optical structure 400 is partially or semi-transparent and substrate 405 is fabricated of a clear substrate material (e.g., polymer, glass, quartz, thermoplastic, etc.). The components of each sub-layer are made sufficiently small and the interstitial gaps are sufficiently large to result in a semi-transparent structure that passes external light 340. Substrate 405 maybe flexible and therefore conformable to a selected shape and curvature using an appropriate frame assembly. Alternatively, substrate 405 may be rigid and its fixed curvature imparted during fabrication.

The array of scattering centers 425 is offset behind the array of microlenses 415. Each scattering center 425 is aligned with a corresponding microlens 415 and positioned substantially at the focal point of its associated microlens 415. Each opaque structure 435 is positioned behind a corresponding scattering center 425 and microlens 415. Collectively, a microlens, scattering center, and opaque structure are referred to herein as a pixel unit 440 of curved optical structure 400. Opaque structures 435 are positioned to block external light 340 from interfering with their associated pixel unit 440.

During operation, an image source 450 illuminates the backside of curved optical structure 400 facing eye 120 with a CGI 455. In one embodiment, CGI 455 is made up of collimated light rays. Microlenses 415 are large enough (e.g., relative to the wavelengths of CGI 455 such that the light rays pass through microlenses 415 without significant scattering. However, scattering centers 425 residing behind microlenses 415 are purposefully design small to cause scattering of the incident light rays of CGI 455. In one embodiment, scattering centers 425 are reflective regions being substantially spherical in shape. Thus, when the backside of curved optical structure 400 is illuminated by image source 450, scattering centers 425 appear to "glow" by scattering the incident light of CGI 455 in a variety of directions. Since the scattering centers 425 are positioned at the focal points of microlenses 415, this scattered and divergent light is re-collimated and emitted towards eye 120 as output light 450. Opaque structures 435 block a significant portion of external light 340 from reaching microlenses 415, thereby reducing washout of the CGI light.

While each scattering center 425 generates non-collimated, divergent light 452, its associated microlens 415 re-collimates divergent light 452, which is output from the associated microlens 415 as collimated output light 450. While the light output from a given pixel unit 440 is collimated, due to the curvature of curved optical structure 400, the output light of a given pixel unit 440 may not be collimated relative to surrounding pixel units 440. However, since light 450 output from each pixel unit 440 is collimated, each individual pixel will appear in focus and displayed at infinity. In one embodiment, the curvature of curved optical structure 400 may be designed to partially or substantially match arc 205 of eye 120, thereby increasing the eye box and field of view of output light 450 relative to a flat surface. In this manner, curved optical structure 400 is also well suited for (but not limited to) near-to-eye applications, such HMDs or HUDs.

Sub-layer 410 may be fabricated via a variety of techniques. For example, a clear polymer material may be spun onto the surface of sub-layer 420, patterned into a checkerboard like pattern and then reflowed to allow surface tension of the fluid to gather the liquid polymer into a lens shape. Of course other fabrication techniques may be used. Although the size may variety according to application, each microlens 415 may be approximately 100 to 200 µm in diameter. Larger or smaller microlenses 415 may be used, so long as microlenses 415 are not too small relative to the wavelengths of CGI 455 to cause significant scattering.

Sub-layer 420 may be implemented by forming small reflective spherical elements within a transparent or partially transparent substrate layer (e.g., clear polymer, thermoplastic, quartz, glass, etc.). For example, scattering centers 425 may be metallic elements with a curved surface, such as spheres, partial spheres, 3-dimensional ("3D") ellipses, partial 3D ellipses, irregular shapes, etc. Scattering centers 425 should be small enough relative to the wavelengths of CGI 455 to purposefully cause scattering and offset from microlenses 415 to be positioned approximately at their focal points. For example, scattering centers 425 may have a diameter of approximately 1-2 µm and offset from microlenses 415 approximately 50 µm. It should be appreciated that these are merely approximate and representative dimensions. Other dimensions may be used.

Figure 5:
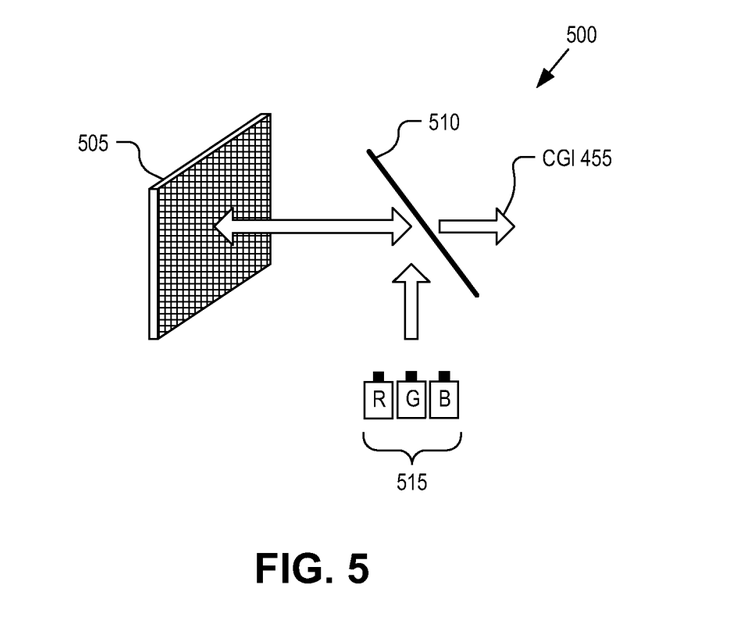
FIG. 5 illustrates an example image source for illuminating a near-to-eye curved optical structure including an embedded array of scattering centers, in accordance with an embodiment of the invention.

FIG. 5 illustrates an example image source 500 for illuminating curved optical structure 400, in accordance with an embodiment of the invention. Image source 500 is one possible implementation of image source 450. The illustrated embodiment of image source 500 includes a liquid crystal on silicon ("LCoS") panel 505, a polarizing beam splitter 510, and an RGB illuminator 515. In one embodiment, illuminator 515 is an RGB laser source. In another embodiment, illuminator 515 is an RGB light emitting diode ("LED") source with a pin hole placed between the LED and polarizing beam splitter 510 to generate substantially collimated output light. The latter embodiment of illuminator 515, while inexpensive, is also relatively inefficient.

Figure 6:
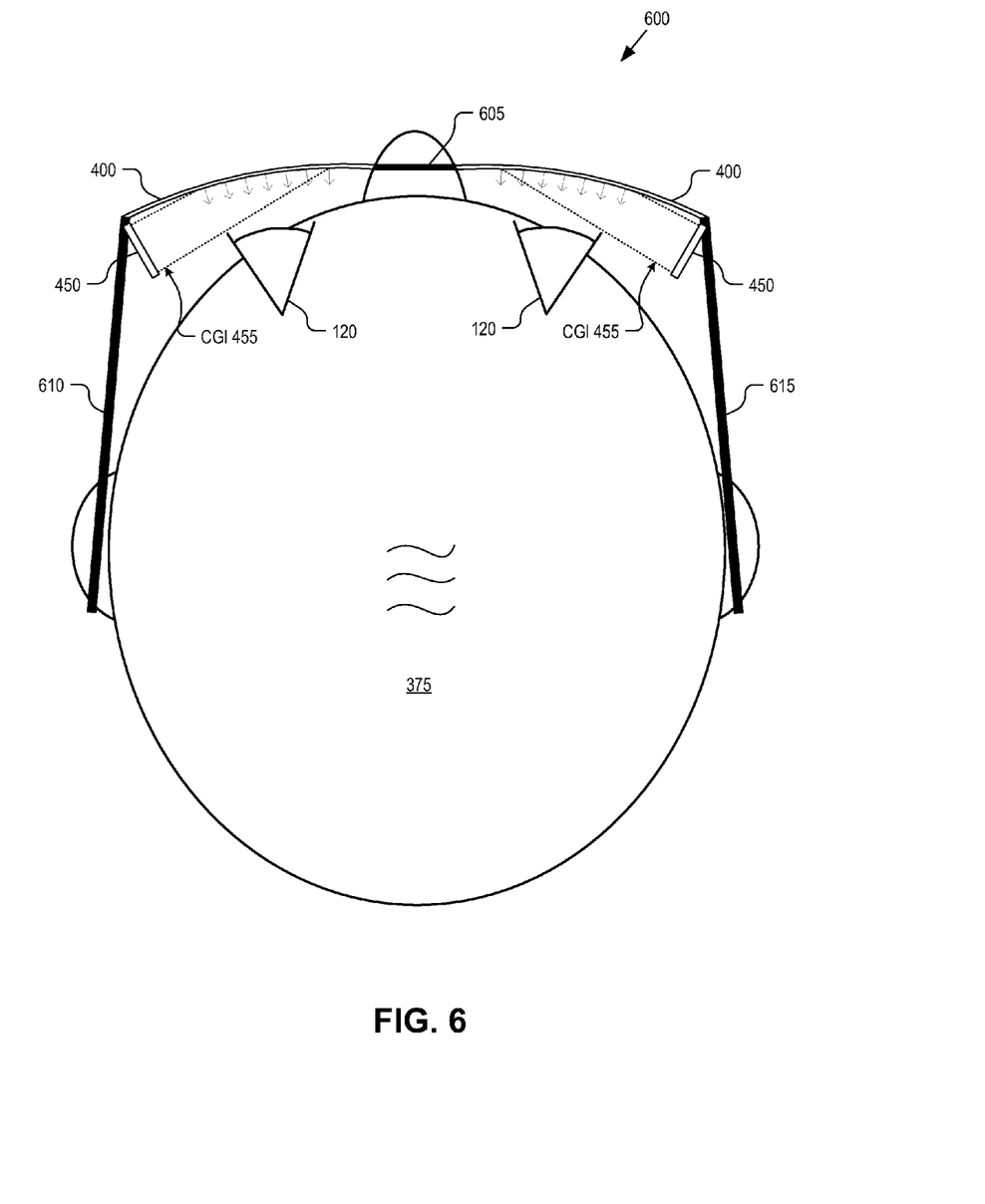
FIG. 6 is a plan view of a near-to-eye display including a curved optical structure having an embedded array of scattering centers, in accordance with an embodiment of the invention.

FIG. 6 is a plan view of a demonstrative near-to-eye display 600 including curved optical structures 400, in accordance with an embodiment of the invention. The illustrated embodiment of near-to-eye display 600 includes two curved optical structures 400, and a frame assembly including a nose assembly 605, left ear assembly 610, and right ear assembly 615.

The two curved optical structures 400 are secured into an eye glass arrangement that can be worn on a head 375 of a user. The left and right ear assemblies 610 and 615 rest over the user's ears while nose assembly 605 rests over the user's nose. The frame assembly is shaped and sized to position each curved optical structure 400 in front of a corresponding eye 120 of the user with the sub-layer 410 facing eyes 120. Of course, other frame assemblies may be used (e.g., single, contiguous visor for both eyes).

The illustrated embodiment is capable of displaying an augmented reality to the user. As such, each curved optical structure 400 is partially transparent and permits the user to see a real world image via external light 340. Left and right (binocular embodiment) CGIs 455 may generated by an image processor (not illustrated) coupled to drive the image sources 450. Left and right CGIs 455 are then scattered, re-collimated, and output by the left and right curved optical structures 400 towards the eyes 120. Since the output light of each pixel unit is collimated and the curvature of curved optical structure 400 partially or substantially matched to arc 205 of eyes 120, the CGIs 455 are virtually projected at infinity and delivered to eyes 120 with a large eye box and field of view. Although the human eye is typically incapable of bringing objects within a few centimeters into focus, since the output light is virtually displayed at infinity it is readily in focus. The CGIs 455 are seen by the user as virtual images superimposed over the real world as an augmented reality.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display apparatus, comprising:
   a substrate;
   an array of microlenses disposed in or on the substrate; and
   an array of reflective scattering centers disposed in or on the substrate and offset relative to the array of microlenses, wherein each of the reflective scattering centers is positioned substantially at a focal point of a corresponding one of the microlenses such that light incident upon a first side of the substrate is scattered off of the reflective scattering centers as scattered light back out the first side of the substrate and at least a portion of the scattered light is collimated by corresponding ones of the microlenses before emission from the display apparatus out the first side of the substrate.

2. The display apparatus of claim 1, wherein the substrate comprises a curved surface.

3. The display apparatus of claim 2, further comprising:
   a frame assembly to which the substrate is mounted, wherein the frame assembly is for wearing on a head of a user; and
   an image source mounted to the frame assembly and oriented to project an image including the light through the array of microlenses onto the first side of the substrate to be scattered off of the reflective scattering centers and back out through the array of microlenses.

4. The display apparatus of claim 3, wherein a curvature of the curved surface is substantially radial to an arc through which a human eye passes when looking around.

5. The display apparatus of claim 3, wherein the microlenses are sufficiently large so as not to significantly scatter the light incident upon the first side, while the reflective scattering centers are sufficiently small to cause scattering of the light.

6. The display apparatus of claim 1, further comprising:
   an array of opaque structures disposed in or on the substrate, wherein each of the opaque structures is aligned with a corresponding one of the microlenses to block external light incident upon a second side of the substrate, opposite the first side, from passing through the corresponding one of the microlenses.

7. The display apparatus of claim 6, wherein the array of opaque structures are disposed in or on the substrate with interstitial gaps to pass the external light through the substrate between the opaque structures such that the substrate appears to be partially transparent.

8. The display apparatus of claim 6, wherein the opaque structures comprise metal.

9. The display apparatus of claim 1, wherein the substrate comprises multiple transparent or semitransparent sub-layers.

10. The display apparatus of claim 1, wherein the reflective scattering centers each comprises a substantially spherical metal ball and the substrate comprises a clear polymer.

11. A display apparatus, comprising:
a curved substrate that is at least partially transparent and flexible;
an array of microlenses disposed in or on the curved substrate, wherein the array of microlenses are oriented along a curvature of the curved substrate; and
an array of light emitting pixels disposed in or on the curved substrate and offset relative to the array of microlenses, wherein the array of light emitting pixels are oriented along the curvature of the curved substrate, wherein each of the light emitting pixels is positioned substantially at a focal point of a corresponding one of the microlenses such that non-collimated light emitted from a given one of the light emitting pixels is collimated by the corresponding one of the microlenses upon emission from the curved substrate.

12. The display apparatus of claim 11, wherein the curved substrate comprises a curved surface.

13. The display apparatus of claim 12, wherein a curvature of the curved surface is substantially radial to an arc through which a human eye passes when looking around.

14. The display apparatus of claim 12, further comprising:
a frame assembly to which the curved substrate is mounted, wherein the frame assembly is shaped for wearing on a head of a user; and
an image processor communicatively coupled to drive the array of light emitting pixels to emit a computer generated image.

15. The display apparatus of claim 11, wherein the array of light emitting pixels comprises an array of organic light emitting diodes (OLEDs).

16. The display apparatus of claim 15, wherein the curved substrate comprises multiple transparent sub-layers including a thin film transistor layer for active matrix addressing of the array of OLEDs.

17. The display apparatus of claim 15, wherein the OLEDs are disposed in or on the curved substrate with interstitial gaps to pass external light through the curved substrate such that the curved substrate appears to be partially transparent for passing a real world view while the array of OLEDs superimpose a computer generated image ("CGI") to form an augmented reality.

18. A method comprising:
projecting a computer generated image ("CGI") onto a first side of a curved optical structure;
scattering the CGI with an array of reflective scattering centers disposed within the curved optical structure;
collimating portions of the scattered CGI as output light with an array of microlenses disposed in or on the curved optical structure; and
directing the output light outwards from the curved optical structure,
wherein the CGI projected onto the first side of the curved optical structure is projected through the array of microlenses before being scattered back through the array of microlenses by the array of reflective scattering centers.

19. The method of claim 18, wherein a curvature of the curved optical structure is substantially radial to an arc through which an eye of a user passes when looking around.

20. The method of claim 18, further comprising:
blocking a first portion of external light incident upon a second side of the curved optical structure, opposite the first side, from passing through the curved optical structure using an array of opaque structures disposed in or on the curved optical structure, wherein each of the opaque structures is aligned with a corresponding one of the microlenses.

21. The method of claim 20, further comprising:
passing a second portion of the external light incident upon the second side through the curved optical structure within interstitial gaps between the opaque structures to provide a real world view to the user; and
augmenting the real world view of the user with the CGI.

22. The method of claim 18, wherein the scattering centers each comprises a substantially spherical metal ball.

* * * * *